United States Patent
Sexton et al.

(10) Patent No.: US 7,552,782 B1
(45) Date of Patent: Jun. 30, 2009

(54) THRUST-BEARING ASSEMBLY

(75) Inventors: Timothy N. Sexton, Santaquin, UT (US); Troy C. Campbell, American Fork, UT (US)

(73) Assignee: US Synthetic Corporation, Orem, UT (US)

( * ) Notice: Subject to any disclaimer, the term of this patent is extended or adjusted under 35 U.S.C. 154(b) by 335 days.

(21) Appl. No.: 11/592,412

(22) Filed: Nov. 2, 2006

(51) Int. Cl.
*F16C 17/10* (2006.01)
(52) U.S. Cl. .......................................... 175/107; 384/97
(58) Field of Classification Search ................. 175/107, 175/371, 372; 384/92, 97, 420, 192, 193, 384/303, 304
See application file for complete search history.

(56) References Cited

U.S. PATENT DOCUMENTS

| 3,521,900 | A | * | 7/1970 | Sakai | ................... | 280/124.134 |
| 4,029,368 | A | * | 6/1977 | Tschirky et al. | ............... | 384/97 |
| 4,410,054 | A | | 10/1983 | Nagel et al. | | |
| 4,560,014 | A | | 12/1985 | Geczy | | |
| 4,593,774 | A | | 6/1986 | Lingafelter | | |
| 4,732,491 | A | * | 3/1988 | Geczy | ......................... | 384/95 |
| 5,092,687 | A | | 3/1992 | Hall | | |
| 5,368,398 | A | | 11/1994 | Damm et al. | | |
| 5,480,233 | A | | 1/1996 | Cunningham | | |
| 2007/0081749 | A1 | * | 4/2007 | Sexton et al. | ............... | 384/420 |

\* cited by examiner

*Primary Examiner*—William P Neuder
(74) *Attorney, Agent, or Firm*—Workman Nydegger

(57) ABSTRACT

Thrust-bearing assemblies, and thrust-bearing apparatuses and downhole motors incorporating such thrust-bearing assemblies are disclosed. In one aspect of the present invention, a thrust-bearing assembly is disclosed. The thrust-bearing assembly comprises a seat including a generally spherical surface at least partially defining a recess. A bearing support is positioned within the recess. The bearing support includes a generally spherical surface configured so that the bearing support is capable of movement with the recess of the seat. At least one bearing element may be mounted to the bearing support. The thrust-bearing assembly further includes a motion-limiting structure configured to limit relative movement between the bearing support and the seat. The motion-limiting structure does not extend between the generally spherical surface of the seat and the generally spherical surface of the bearing support.

21 Claims, 14 Drawing Sheets

THRUST-BEARING ASSEMBLY

TECHNICAL FIELD

The present invention relates to a thrust-bearing assembly configured to accommodate non-uniform loading and/or angular misalignment. The present invention also relates to a thrust-bearing apparatus and a downhole tool (e.g., a motor or turbine for use in a subterranean drilling system) or any other apparatus incorporating such a thrust-bearing assembly.

BACKGROUND

Subterranean drilling systems that employ downhole drilling motors are commonly used for drilling boreholes in the earth for oil and gas exploration. FIG. 1 shows an isometric view of a prior art subterranean drilling system 10. The subterranean drilling system 10 includes a housing 18 enclosing a downhole drilling motor 12 (i.e., a motor, turbine, or any other device capable of rotating) that is operably connected to an output shaft 14 and a thrust-bearing apparatus 16 assembled to the downhole drilling motor 12. A rotary drill bit 20 configured to engage a subterranean formation and drill a borehole is connected to the output shaft 14. The rotary drill bit 20 is shown as a "roller cone" type bit including a plurality of roller cones 22. However, other types of rotary drill bits, such as so called "fixed cutter" drill bits are also commonly used. As the borehole is drilled, pipe sections may be connected to the subterranean drilling system 10 to form a drill string capable of progressively drilling the borehole to a greater depth within the earth.

The thrust-bearing apparatus 16 includes a stator 24 that does not rotate and a rotor 26 that is attached to the output shaft 14 and rotates with the output shaft 14. The stator 24 and rotor 26 each include a plurality of bearing elements 25 that may be fabricated from superhard (polycrystalline diamond) compacts for providing diamond bearing surfaces that bear against each other during use.

In operation, high pressure drilling fluid is circulated through the drill string and power section (not shown) of the downhole drilling motor 12, usually prior to the rotary drill bit 20 engaging the bottom of the borehole, to generate torque and rotate the output shaft 14 and the rotary drill bit 20 attached to the output shaft 14. The drilling fluid is also used for lubricating and cooling the bearing surfaces of the bearing elements 25 during operation. The housing 18 of the downhole drilling motor 12 remains stationary as the output shaft 14 rotates the rotary drill bit 20. When the rotary drill bit 20 engages the bottom of the borehole, a thrust load is generated that tends to push the rotary drill bit 20 and the drill string downhole to generate what is commonly referred to as "on-bottom thrust." The on-bottom thrust is carried, at least in part, by the thrust-bearing apparatus 16. In the absence of on-bottom thrust, fluid flow through the power section may cause what is commonly referred to as "off-bottom thrust." The drilling fluid used to generate the torque for rotating the rotary drill bit 20 exits openings formed in the rotary drill bit 20 and returns to the surface, carrying the cuttings of the subterranean formation through an annular space between the drilled borehole and the subterranean drilling system 10.

Both the off-bottom and on-bottom thrust carried by the thrust-bearing apparatus 16 can be extremely large. Accordingly, the operational lifetime of the thrust-bearing apparatus 16 often determines the useful life for the subterranean drilling system 10. During operation, bending and/or side loading of the downhole drilling motor 12 can cause some of the bearing elements 25 to experience higher than desired stresses and temperatures. A slight angular misalignment between the stator 24 and rotor 26 of the thrust-bearing apparatus 16 due to such bending and/or side loading may cause certain bearing elements 25 to partially contact or even fail to contact each other during operation, causing other bearing elements 25 to contact each other at higher than desired stresses. The bearing elements 25 that remain in contact with each other may experience sufficiently large stresses and sufficiently high temperatures during drilling to damage or even fracture the bearing elements 25 and, ultimately, may cause premature failure of the downhole drilling motor 12.

Therefore, manufacturers and users of subterranean drilling systems continue to seek improved thrust-bearing apparatuses that can accommodate angular misalignment between stator and rotor components.

SUMMARY

Various aspects of the present invention are directed to thrust-bearing assemblies configured to accommodate non-uniform loading and angular misalignment with an adjacent thrust-bearing assembly, and bearing apparatuses and systems (e.g., down hole drilling motors, turbines, or other rotating apparatuses for use in a subterranean drilling system) incorporating such thrust-bearing assemblies. In one aspect of the present invention, a thrust-bearing assembly is disclosed. The thrust-bearing assembly comprises a seat including a generally spherical surface at least partially defining a recess. A bearing support is positioned within the recess. The bearing support includes a generally spherical surface configured so that the bearing support is capable of movement with the recess of the seat. At least one bearing element may be mounted to the bearing support. The thrust-bearing assembly further includes a motion-limiting structure configured to limit relative movement between the bearing support and the seat. The motion-limiting structure does not extend between the generally spherical surface of the seat and the generally spherical surface of the bearing support. In one embodiment of the present invention, the motion-limiting structure may include one or more projections that extend radially from the bearing support.

Additional aspects of the present invention are directed to a thrust-bearing apparatus and a downhole motor that incorporate thrust-bearing assemblies encompassed by the present invention.

DETAILED DESCRIPTION OF THE VARIOUS EMBODIMENTS

Various embodiments of the present invention are directed to thrust-bearing assemblies configured to accommodate non-uniform loading and angular misalignment and bearing apparatuses (e.g., downhole motors for use in subterranean drilling systems) incorporating such thrust-bearing assemblies. The disclosed thrust-bearing assembly embodiments provide a bearing support that is capable of movement relative to a seat defining a recess within which the bearing support is positioned. For example, the bearing support may be rotatable about any number of axes generally perpendicular to a thrust axis so that the bearing elements can maintain contact with the bearing elements of an adjacent thrust-bearing assembly, such as a stator or rotor of a thrust-bearing apparatus.

Figure 1:
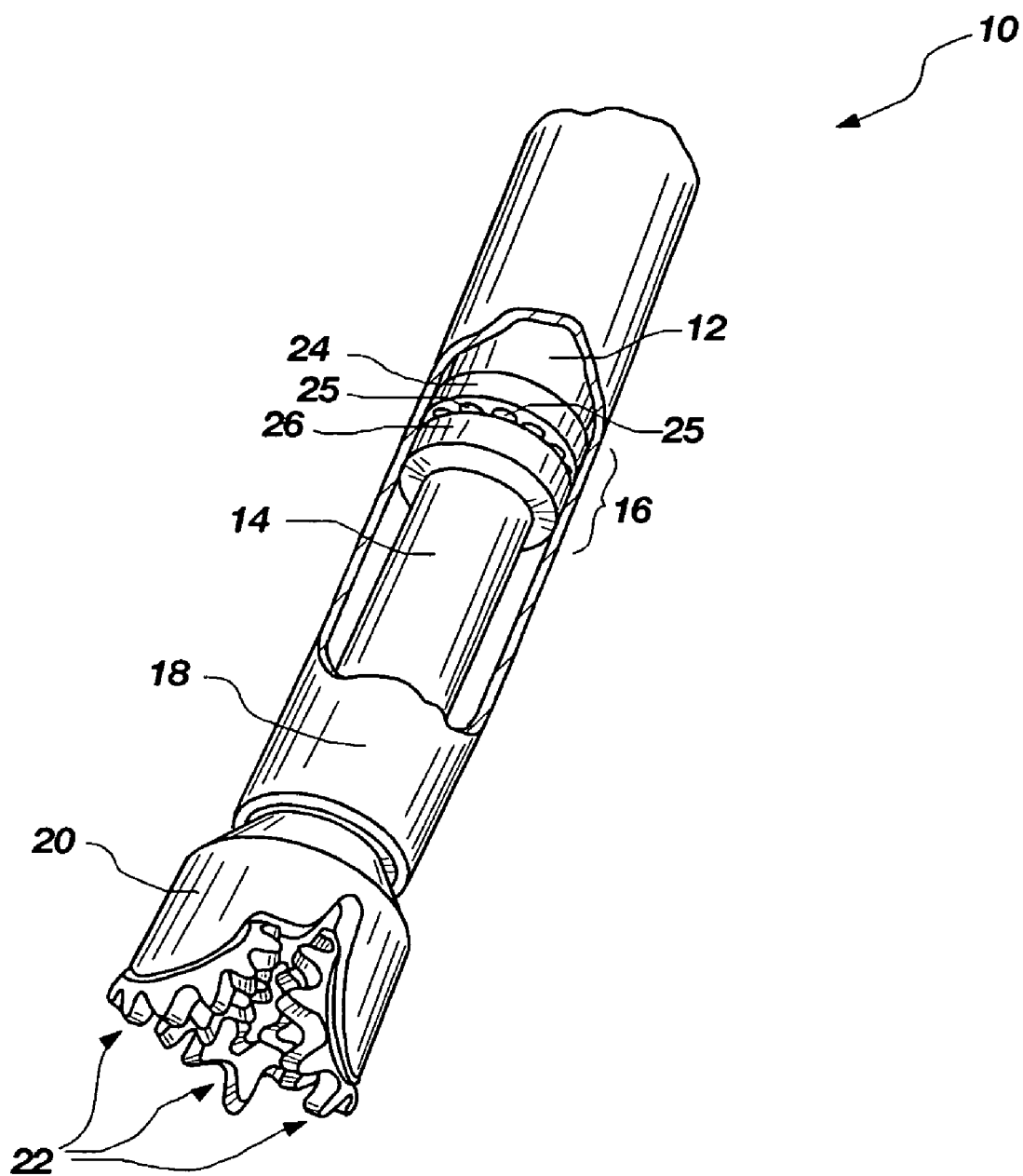
FIG. 1 is an isometric, partial, cut-away view of a prior art subterranean drilling system including a thrust-bearing apparatus.
Figure 2:
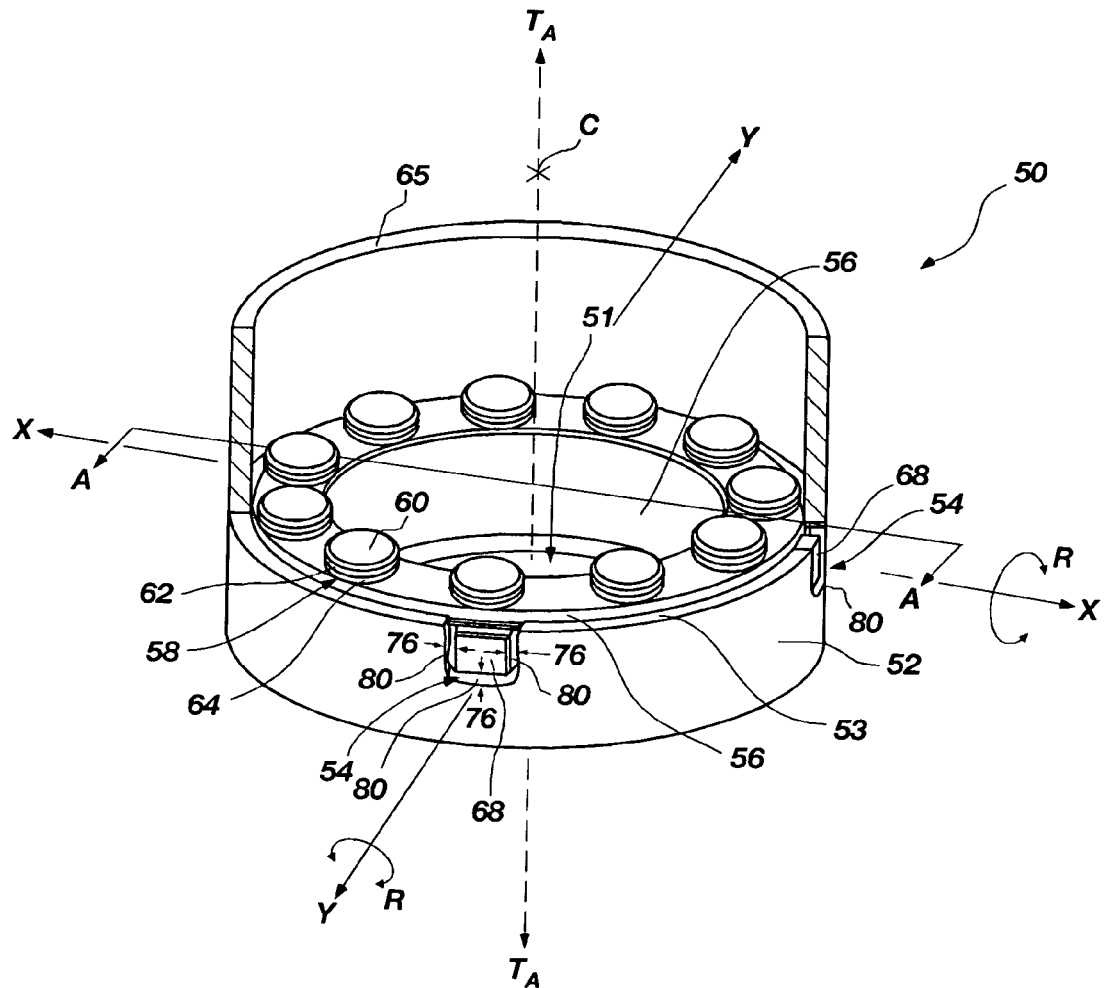
FIG. 2 is an isometric, partial, cut-away view of a thrust-bearing assembly in accordance with one embodiment of the present invention.

FIG. 2 shows an isometric, partial, cut away view of a thrust-bearing assembly 50 in accordance with one embodiment of the present invention. The thrust-bearing assembly 50 includes an aperture 51 generally centered about a thrust axis $T_A$, for receiving a motor shaft (e.g., a downhole drilling motor shaft) along which a thrust force may be generally directed during use. The thrust-bearing assembly 50 includes a seat 52 with a plurality of circumferentially spaced apart slots 54 and a bearing support 56 that is received within a recess 66 (FIG. 3) formed in the seat 52. A plurality of projections 68 (i.e., a motion-limiting structure) may extend radially outward from the bearing support 56 and generally away from the thrust axis $T_A$. Each of the projections 68 is received in one of the slots 54 formed in the seat 52 to limit rotation of the bearing support 56 about the thrust axis $T_A$ during operation. Although a plurality of projections 68 are illustrated in FIG. 2, other embodiments of the present invention may include only one or at least one projection as the motion-limiting structure. As will be discussed in more detail below, the bearing support 56 may rotate in a direction R within the recess 66 about any axis (e.g., an axis that is generally perpendicular to the thrust axis $T_A$.) The X and Y axes illustrated in FIG. 2 represent two exemplary axes of an infinite number of axes about which the bearing seat support 56 may rotate.

The bearing support 56 also includes a plurality of circumferentially spaced apart bearing elements 58, each of which includes a bearing surface 60. The bearing elements 58 may be mounted in corresponding recesses (not shown) formed in the bearing support 56. As illustrated in FIG. 2, the bearing elements 58 may be superhard compacts (e.g., polycrystalline diamond compacts "PDCs"), which include a superhard table 62 of superhard material (e.g., polycrystalline diamond) bonded to a substrate 64 (e.g., a cobalt-cemented tungsten carbide substrate). The term "superhard," as used herein, means a material having a hardness exceeding a hardness of tungsten carbide. Any superhard material may be used, such as silicon carbide, a silicon carbide polycrystalline diamond composite, polycrystalline cubic boron nitride, polycrystalline cubic boron nitride and polycrystalline diamond, silicon carbide and polycrystalline boron nitride mixed with polycrystalline diamond, or any other suitable superhard material. Additionally, the bearing elements 58 may have other configurations than the illustrated configuration shown in FIG. 2. For example, the bearing elements 58 may have a convex or concave bearing surface 60, or another configuration designed for a particular bearing application.

The thrust-bearing assembly 50 further includes a retaining ring 65 generally centered about the thrust axis $T_A$ and positioned adjacent to an upper surface 53 of the seat 52. Thus, a portion of the retaining ring 65 may capture each of the projections 68 within each of the slots 54. Further, such a configuration may limit movement of the bearing support 56 relative to the seat 52 and vice versa. The bearing support 56 may be coupled to the thrust-bearing assembly 50 by the retaining ring 65. For example, the retaining ring 65 may be secured in place adjacent to the projections 68 of the bearing support 56 by attaching the retaining ring 65 (e.g., threadlike) to the seat 52 and securing the retaining ring 65 in position by attaching it to a housing (not shown) or by another suitable attachment structure.

Figure 3:
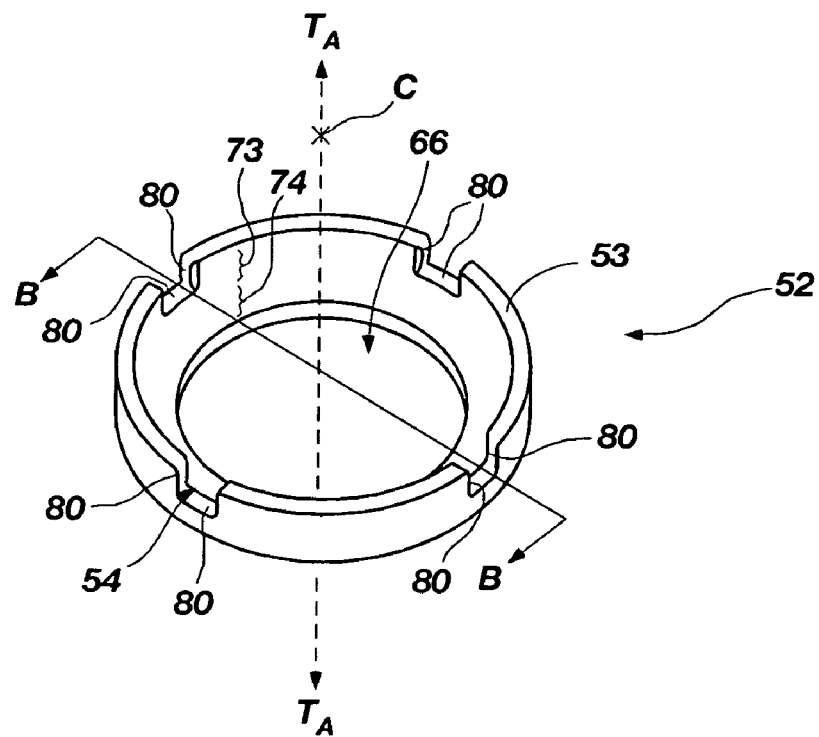
FIG. 3 is a top isometric view of the seat shown in FIG. 2.
Figure 4:
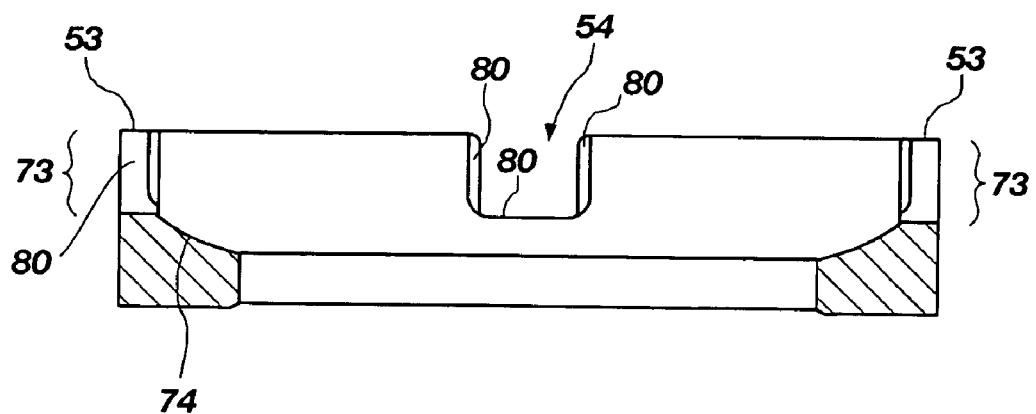
FIG. 4 is a side cross-sectional view of the seat shown in FIGS. 2 and 3 taken along line B-B of FIG. 3.

FIGS. 3 through 6 illustrate the structure of the seat 52 and the bearing support 56 in more detail. With reference to FIGS. 3 and 4, the seat 52 includes a peripherally extending wall 73 with a concave-generally-spherical surface 74, which collectively define the recess 66 that receives the bearing support 56. Each of the slots 54 formed in the wall 73 is defined by walls 80.

Figure 5:
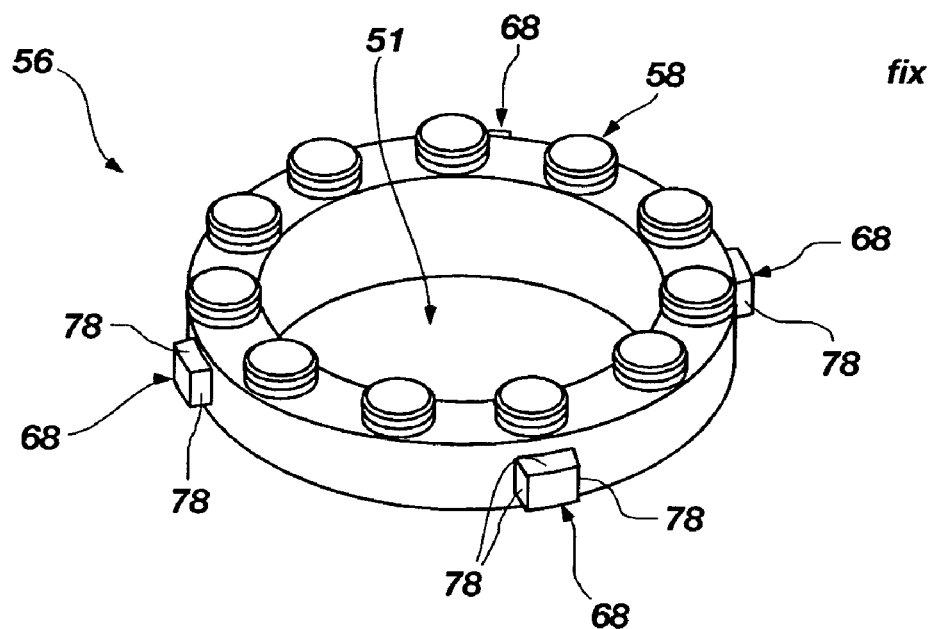
FIG. 5 is a top isometric view of the bearing support and bearing elements shown in FIG. 2.
Figure 6:
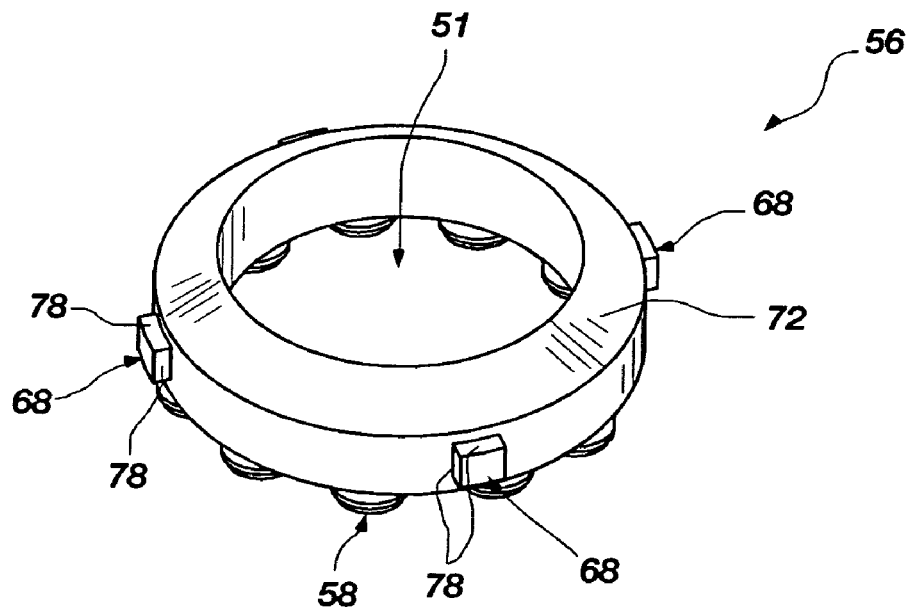
FIG. 6 is a bottom isometric view of the bearing support shown in FIG. 2.

As shown in FIGS. 5 and 6, the bearing support 56 may exhibit a generally ring-shaped configuration so that a shaft of a motor or other rotating apparatus (e.g., a downhole drilling motor) may be inserted through the aperture 51. As previously discussed, the bearing support 56 includes a plurality of radially extending projections 68 having peripheral sides 78. Each of the projections 68 is received in one of the slots 54 (FIG. 3) formed in the seat 52 when the bearing support 56 is positioned within the recess 66 (FIG. 3) of the seat 52. The bearing support 56, including the integrally formed projections 68, may be machined from a blank of machinable material, such as a metal (e.g., high-strength steel) or another suitable material. However, in other embodiments, pins may be press-fit or threaded into the bearing support 56 to form projections 68. Such a configuration may allow for the projections 68 to be replaceable. The bearing support 56, seat 52, or both may comprise a metallic material, such as steel, or may be made from a more wear resistant material, such as cemented tungsten carbide, silicon carbide, or another material more resistant to galling than steel. In other embodiments of the present invention, the walls 80 of the seat 52 may comprise a material more wear resistant than steel, such as cemented tungsten carbide, silicon carbide, diamond, or another suitable wear resistant material. For example, a coating may be attached to the walls 80 of the slots 54 and/or the peripheral sides 78 of the projections 68, for example, by brazing, hard facing, etc. to provide more a wear resistant structure.

Still referring to FIGS. 5 and 6, the projections 68 and the walls 80 of the slots 54 formed in the seat 52 (FIG. 3) are configured so that they cooperate to limit relative movement between the bearing support 56 and seat 52 during use. Explaining further, sufficient movement of the bearing support 56 relative to seat 52 will cause the projections 68 to physically interfere with the walls 80 of the slots 54. Accordingly, the configuration of the projections 68 and the slots 54 may reduce damage due to the concave-generally-spherical surface 74 of the seat 52 and a convex-generally-spherical back surface 72 of the bearing support 56 binding against one another during operation. When the bearing support 56 and seat 52 are assembled to one another, the centers of curvature of the concave-generally-spherical surface 74 (FIGS. 3 and 4) of the seat 52 and the convex-generally-spherical back surface 72 of the bearing support 56, are located at approximately the same position in space represented by center of curvature C. In the illustrated embodiment, the radiuses of curvature of the concave-generally-spherical surface 74 (FIGS. 3 and 4) of the seat 52 and the convex-generally-spherical back surface 72 are also substantially equal to each other to facilitate distributing a thrust load (generally along the thrust axis $T_A$) over substantially the entire surface area of the convex-generally-spherical back surface 72 and concave-generally-spherical surface 74 (FIGS. 3 and 4) during use.

Figure 7:
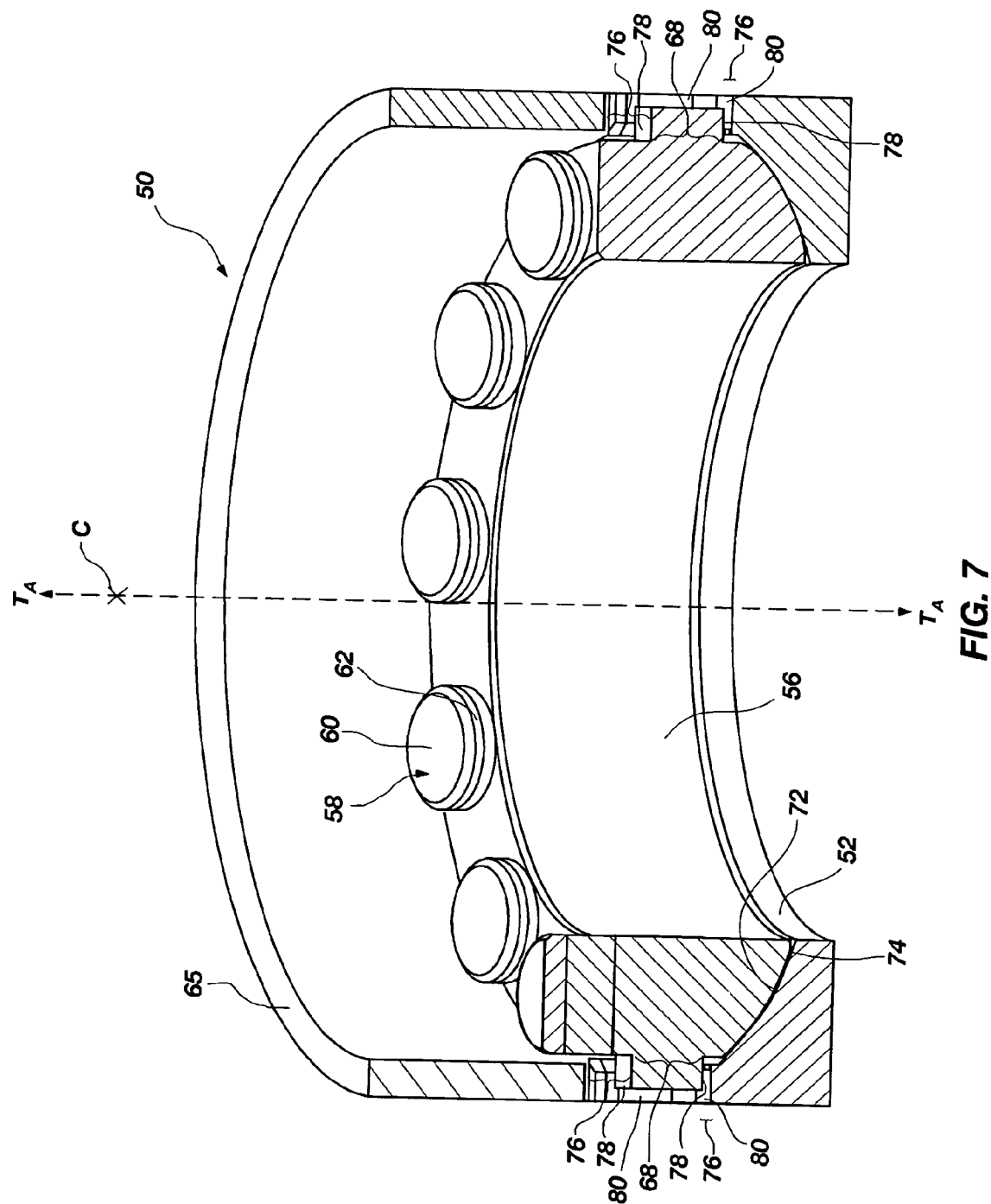
FIG. 7 is an isometric cut-away view of FIG. 2, taken along line A-A, showing the structure of the seat and bearing support in more detail.
Figure 8:
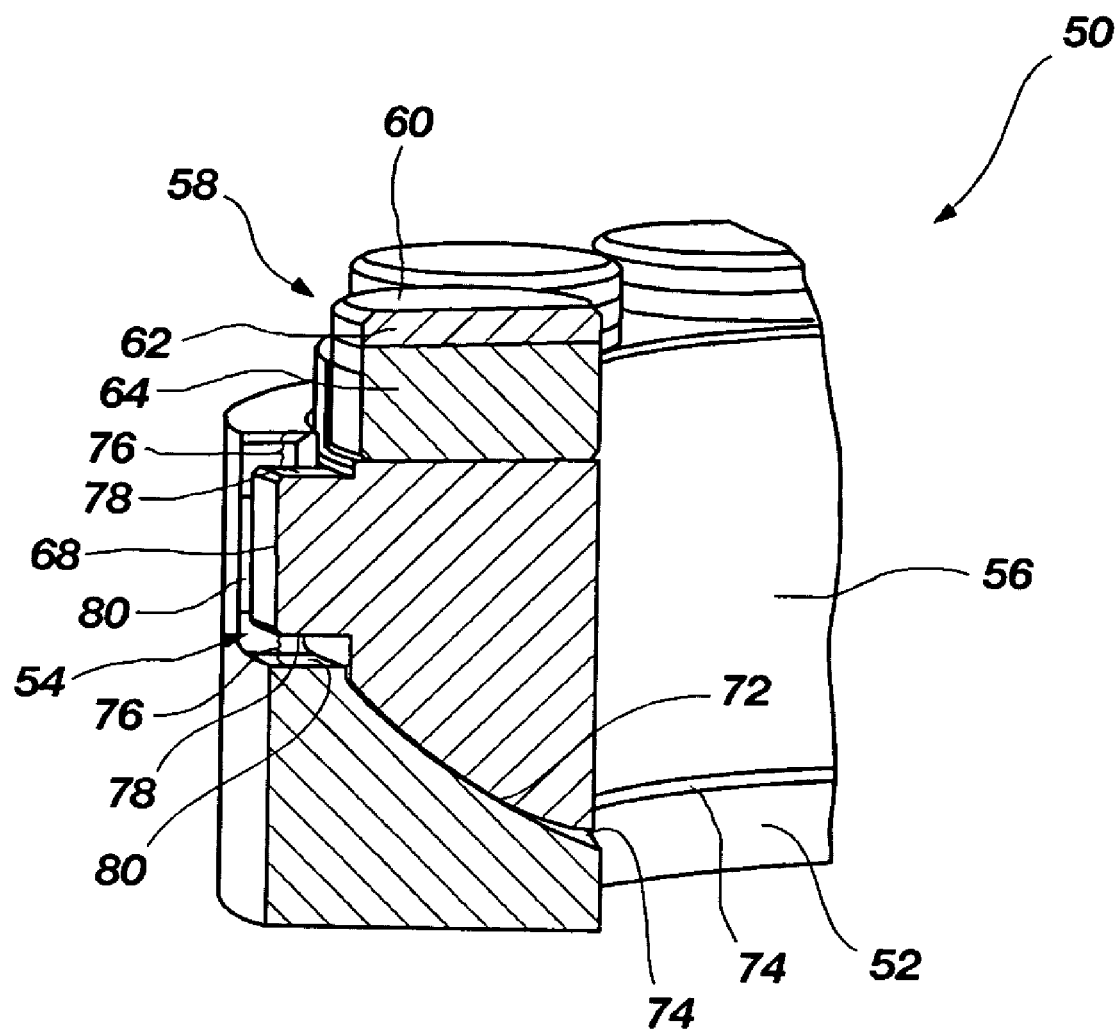
FIG. 8 is an isometric, partial, cut-away view of the thrust-bearing assembly shown in FIG. 2 that illustrates the structure of the laterally-extending projections of the bearing support and corresponding slots that receive the projections.

As shown in the various isometric views of FIGS. 2, 7, and 8, the bearing support 56 and seat 52 may be configured to accommodate non-uniform loading and angular misalignment (e.g., up to about two degrees or more). For example, the slots 54 of the seat 52 may be selectively oversized relative to the size of the projections 68. Thus, when the convex-generally-spherical back surface 72 of the bearing support 56 is mated with (e.g., at least partially abutting) the concave-generally-spherical surface 74 of the seat 52, a gap or standoff 76 is provided between the peripheral sides 78 of each of the projections 68 and the walls 80 of a corresponding one of the slots 54. The combination of the standoff 76 and the common center of curvature C for the convex-generally-spherical back surface 72 and the concave-generally-spherical surface 74 enables rotation of the bearing support 56 within the recess 66 (FIG. 3) about any number of axes generally perpendicular to the thrust axis $T_A$. Additionally, it is also apparent from FIG. 7 that the projections 68 do not extend between the concave-generally-spherical surface 74 of the seat 52 and the convex-generally-spherical back surface 72 of the bearing support 56.

Figure 9A:
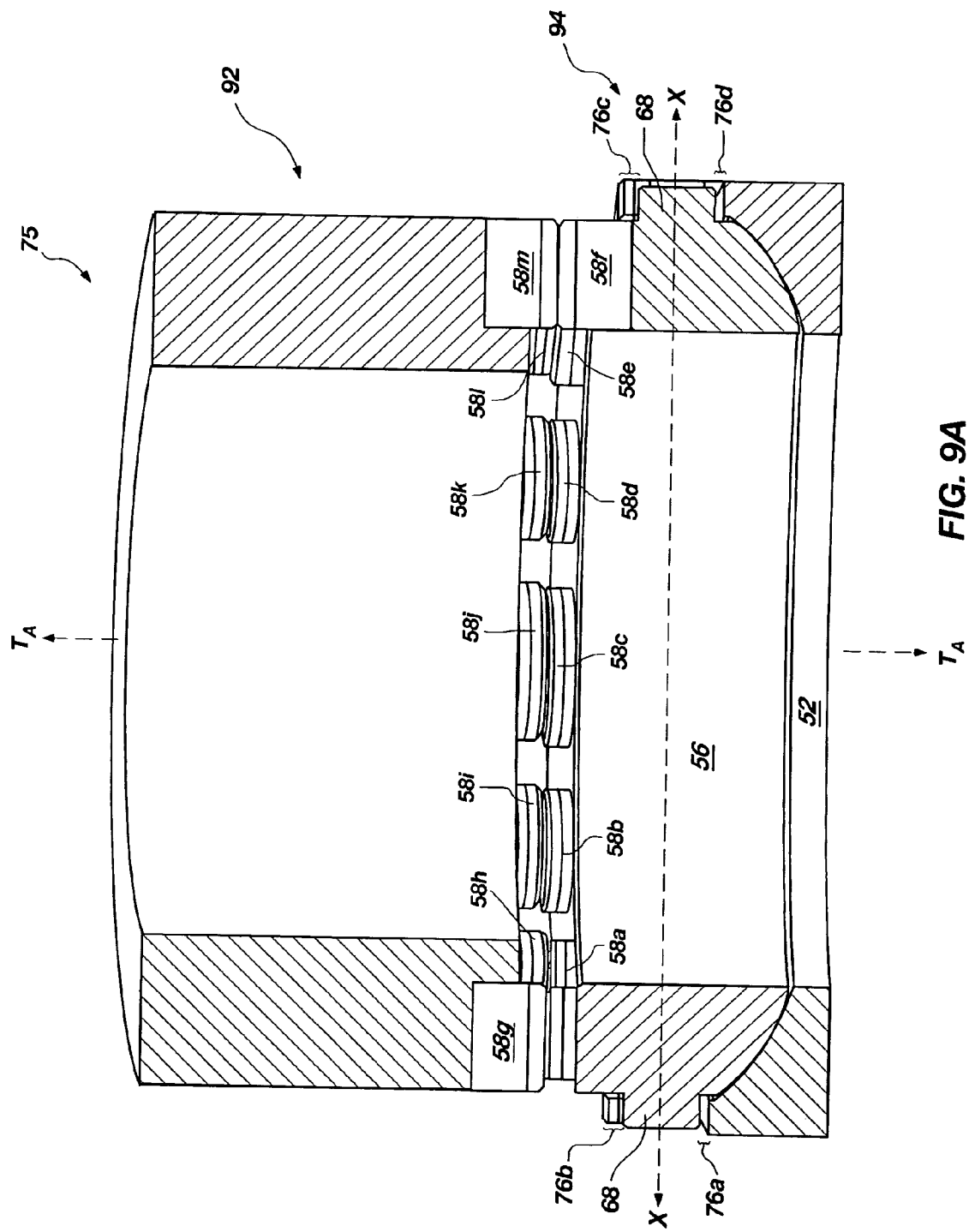
FIG. 9A is a side cross-sectional isometric view of one embodiment of a thrust-bearing apparatus including a stator configured as the thrust-bearing assembly of FIG. 2 with the bearing support of the stator in a neutral position.
Figure 9B:
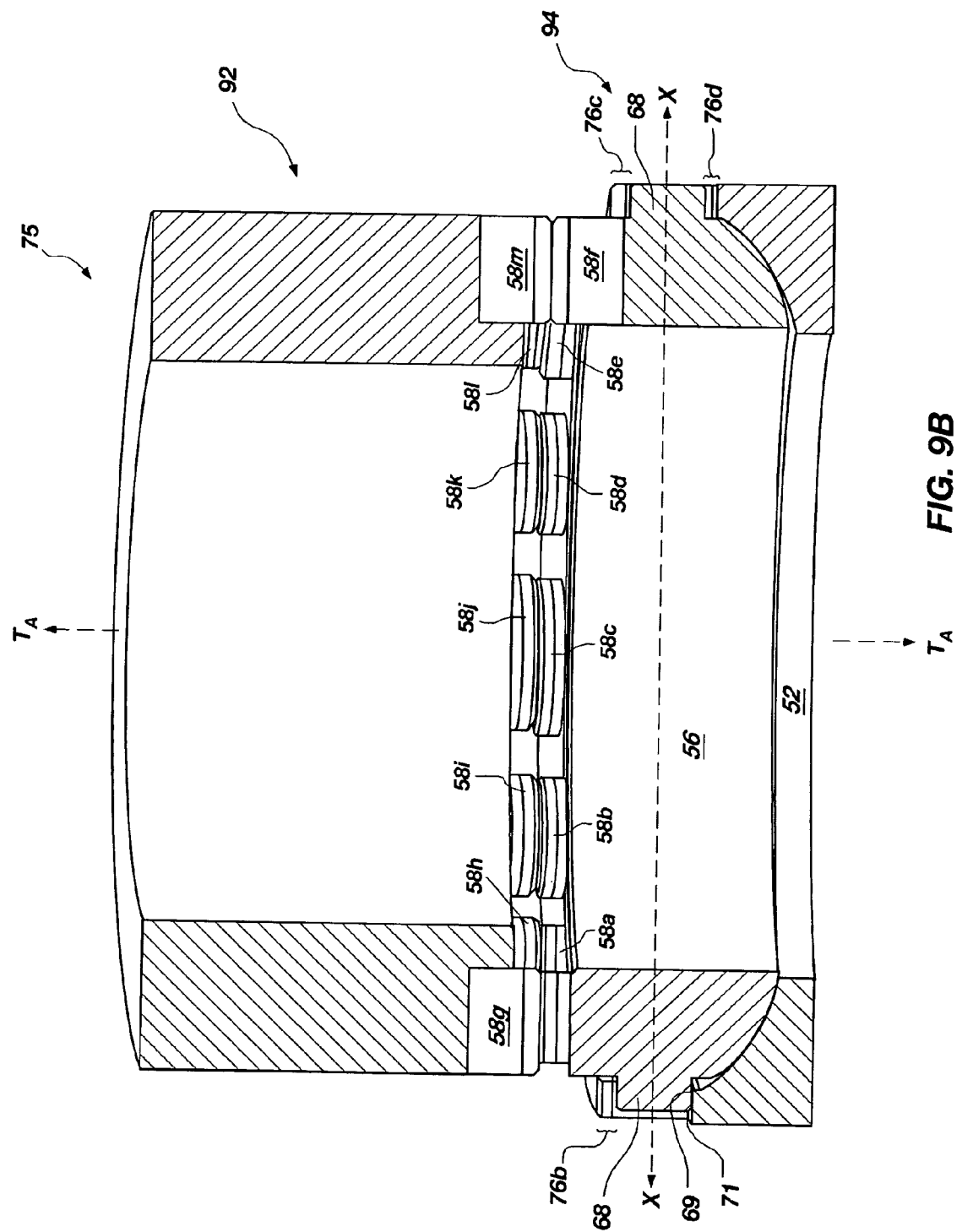
FIG. 9B is a side cross-sectional isometric view of a thrust-bearing apparatus wherein the stator is displaced to accommodate angular misalignment and non-uniform loading of the bearing elements.

The manner in which the bearing support 56 is capable of rotating within the seat 52 is illustrated with reference to FIGS. 9A and 9B. FIGS. 9A and 9B show side cross-sectional isometric views of a thrust-bearing apparatus 75 in accordance with one embodiment of the present invention. The thrust-bearing apparatus 75 includes a rotor 92 and stator 94. The terms "rotor" and "stator" refer to rotating and stationary portions of a thrust-bearing apparatus, respectively, and, therefore, the terms "rotor" and "stator" may refer to similar or identical structures configured to rotate and remain stationary, respectively. In FIGS. 9A and 9B, the retaining ring 65 is not illustrated for the sake of clarity. The rotor 92 and/or the stator 94 may be configured to correspond to any of above-described embodiments shown in FIGS. 2-8. However, the illustrated embodiment of FIGS. 9A and 9B show the stator 94 configured as the thrust-bearing assembly 50 of FIG. 2. FIG. 9A shows the bearing support 56 of the stator 94 in a neutral position (i.e., when a central axis of the seat 52 and a central axis of the bearing support 56 are each generally aligned with the thrust axis $T_A$) with an equal amount of standoff 76 between the peripheral surface 78 of each of the projections 68 of the bearing support 56 and the walls 80 of corresponding slots 54 of the seat 52 due to a substantially uniform load across the bearing elements 58 of the stator 94. Bending, side loading, or other loading of the thrust-bearing apparatus 75 may cause nonuniform loading of bearing elements 58. For example, some of the bearing elements 58 may only partially contact or even fail to contact with each other during use and, thus, may load the remaining bearing elements 58 in greater contact with each other to a higher extent. This may result in premature failure if the bearing support 56 of the stator 94 is not configured to accommodate such misalignment.

As shown in FIG. 9B, when the bearing element 58a of the stator 94 is loaded to a greater extent than the other bearing elements 58b-58f, the bearing support 56 may rotate over an angle about any number of axes, each of which is generally perpendicular to the thrust axis $T_A$, so that the bearing elements 58b-58f and the other bearing elements not shown compensate toward the rotor 92 to maintain contact with adjacent bearing elements 58i-58m of the rotor 92. The magnitude of the angle that the bearing support 56 rotates is determined, in part, by the size of the standoff 76. The rotation of the bearing support 56 is apparent in FIG. 9B from lower surface 69 of the projection 68 adjacent the bearing element 58a abutting lower surface 71 of seat 52 (i.e., standoff 76a being substantially zero) and the magnitude of the standoff 76d increasing between the projection 68 and the seat 52 adjacent the bearing element 58f. The ability of the bearing support 56 to rotate to maintain contact between the bearing elements 58 of the stator 94 and the rotor 92 may inhibit premature fracture of the bearing elements 58 and, consequently, may inhibit failure of the thrust-bearing apparatus 75. Furthermore, as previously discussed, the combination of the structure of the seat 52 and the projections 68 may inhibit or limit the bearing support 56 from rotating a substantial extent about the thrust axis $T_A$ due to frictional forces generated due to rotation of the rotor 92.

Figure 10:
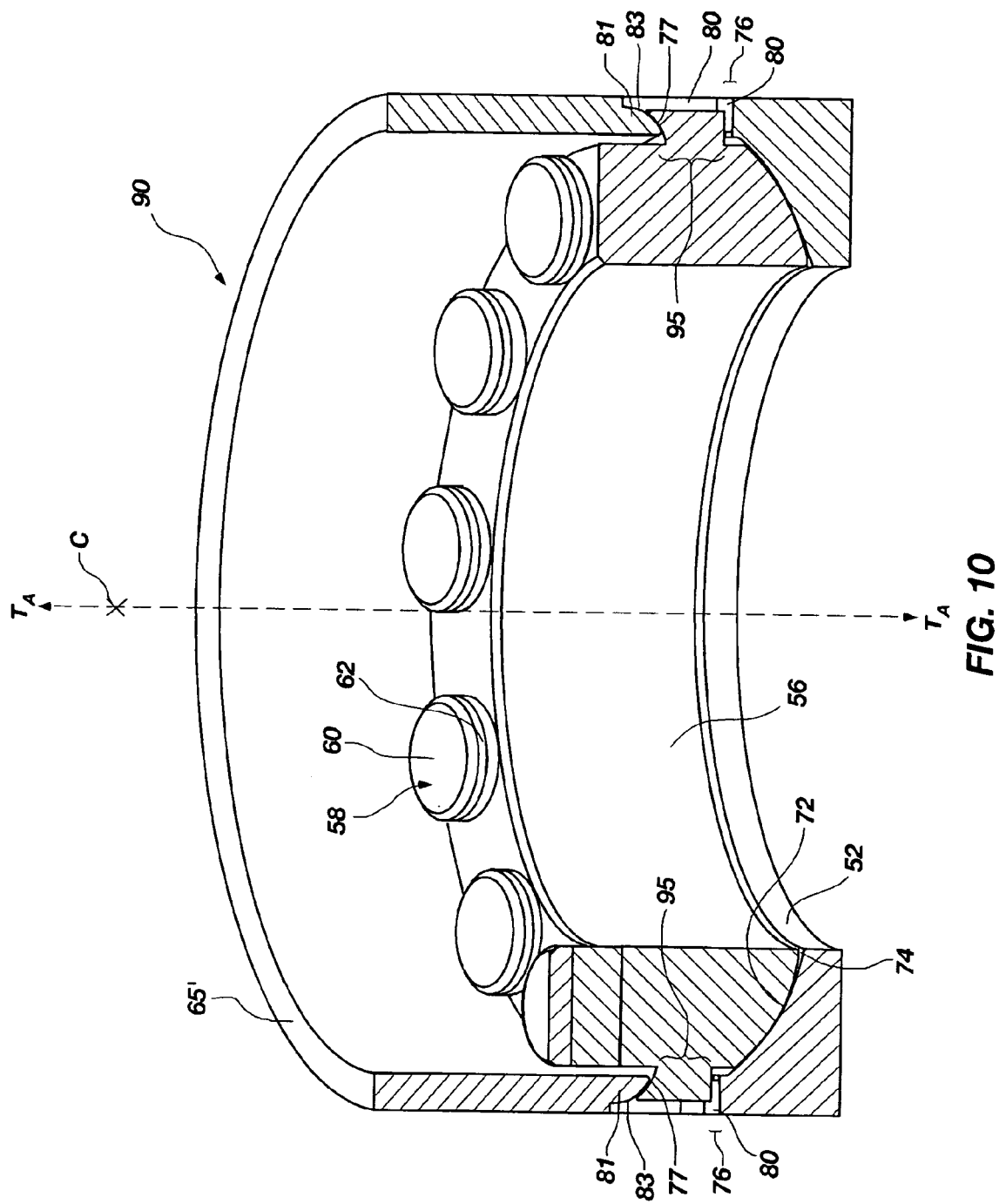
FIG. 10 is an isometric cut-away view of a thrust-bearing assembly that includes a retaining ring configured to reduce mechanical play and vibration in accordance with another embodiment of the present invention.

FIG. 10 shows a side cross-sectional isometric view of a thrust-bearing assembly 90 in accordance with another embodiment of the present invention that is structurally similar to the thrust-bearing assembly 50 of FIG. 2. Each projection 95 that extends from the bearing support 56 includes a concave-generally-spherical surface 77. Retaining ring 65' also includes a plurality of circumferentially-spaced-apart engagement members 81, each of which includes a convex-generally-spherical surface 83. The convex-generally-spherical surfaces 83 may be curved to correspond to the curvature of the concave-generally-spherical surface 77 of the projections 95. When the retaining ring 65', bearing support 56, and seat 52 are assembled together, the centers of curvature of the concave-generally-spherical surface 77 and the convex-generally-spherical surfaces 83 may be located in approximately the same location in space as the center of curvature C of the concave-generally-spherical surface 74 of the seat 52 to enable the bearing support 56 to move relative to seat 52 (e.g., rotation about any number of axes generally perpendicular to the thrust axis $T_A$) in a manner similar to stator 94 of FIGS. 9A and 9B. Each of the convex-generally-spherical surfaces 83 of the engagement members 81 engage a corresponding one of the concave-generally-spherical surfaces 77 of the projections 95, which may reduce mechanical play and/or vibration between the bearing support 56 and the seat 52 that may be present in the thrust-bearing assembly 50 of FIG. 2 due to the slots 54 being oversized relative to the projections 68.

Figure 11:
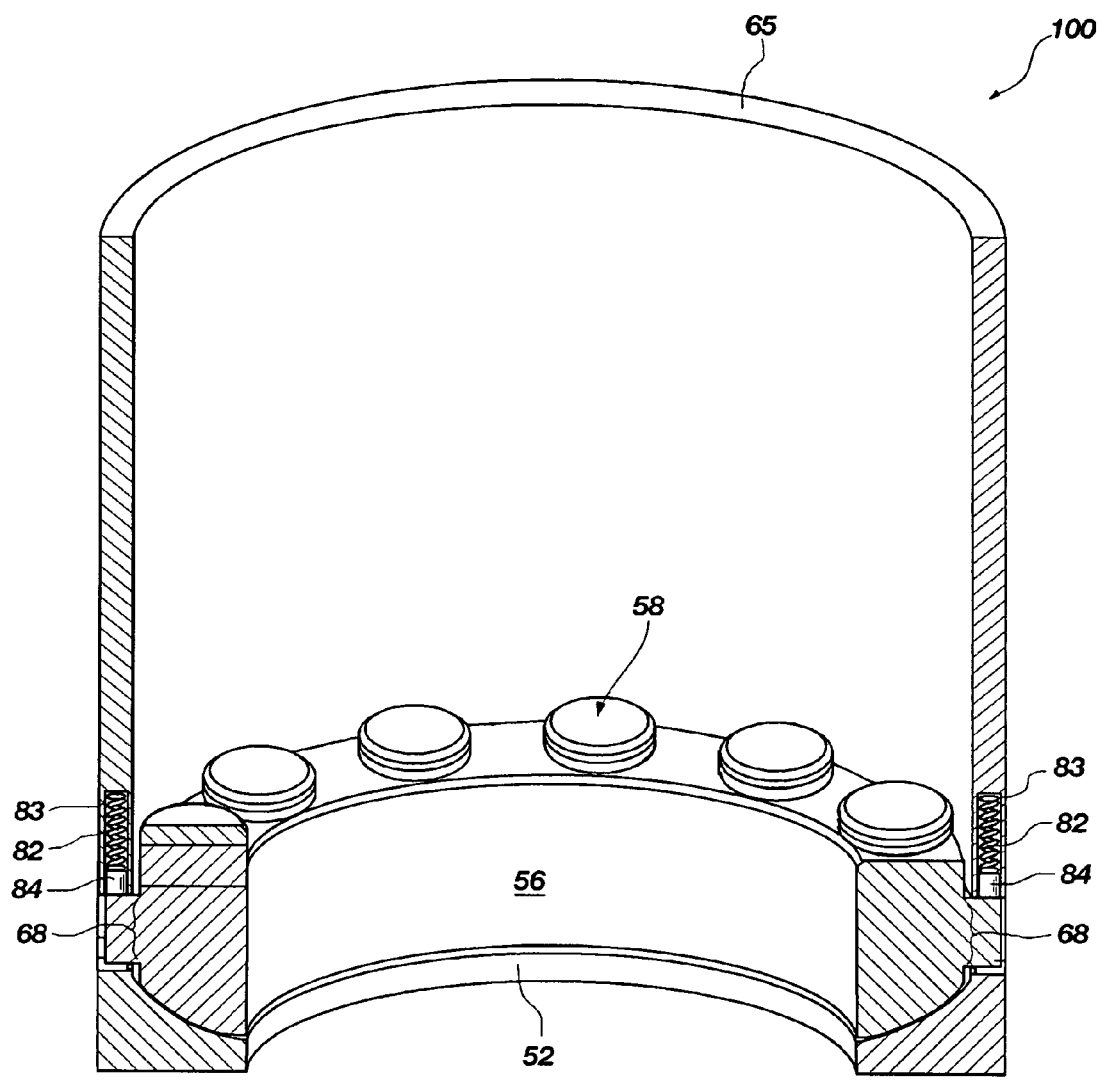
FIG. 11 is an isometric cut-away view of the thrust-bearing assembly including a retaining ring with a plurality of biasing elements for providing a selected stiffness to the bearing support in accordance with another embodiment of the present invention.

Additional embodiments of the present invention are directed to structures for providing a selected stiffness or resistance in response to relative movement between the bearing support 56 and the seat 52 (e.g. about a plurality of axes generally perpendicular to the thrust axis $T_A$). Generally, a thrust-bearing assembly may include at least one biasing element configured to provide a selected level of resistance to relative motion between bearing support 56 and seat 52. FIG. 11 shows one embodiment of a thrust-bearing assembly 100 in accordance with the present invention in which the retaining ring 65 may include biasing elements 82, such as coiled compression springs or other suitable spring elements. Each of the biasing elements 82 is positioned within a respective hole 83 in the retaining ring 65 and over a corresponding one of the projections 68. The biasing elements 82 bias against corresponding projections 68 to help reduce vibration and/or mechanical play that may be present due to the slots 54 being oversized relative to the projections 68 and vibration between the bearing support 56 and the seat 52 during operation. In such an embodiment, the bearing support 56 exhibits a rotational stiffness that may be tailored based on the selection of the stiffness of the biasing elements 82. In some embodiments of the present invention, optional, cylindrical elements 84 may be coupled to an end of each of the biasing elements 82 to provide a more uniform contact area for bearing against each of the projections 68. One of ordinary skill in the art will also recognize that a Bellville washer-type spring or other circumferentially-extending biasing element may be positioned between the retaining ring 65 and the projections 68.

Figure 12:
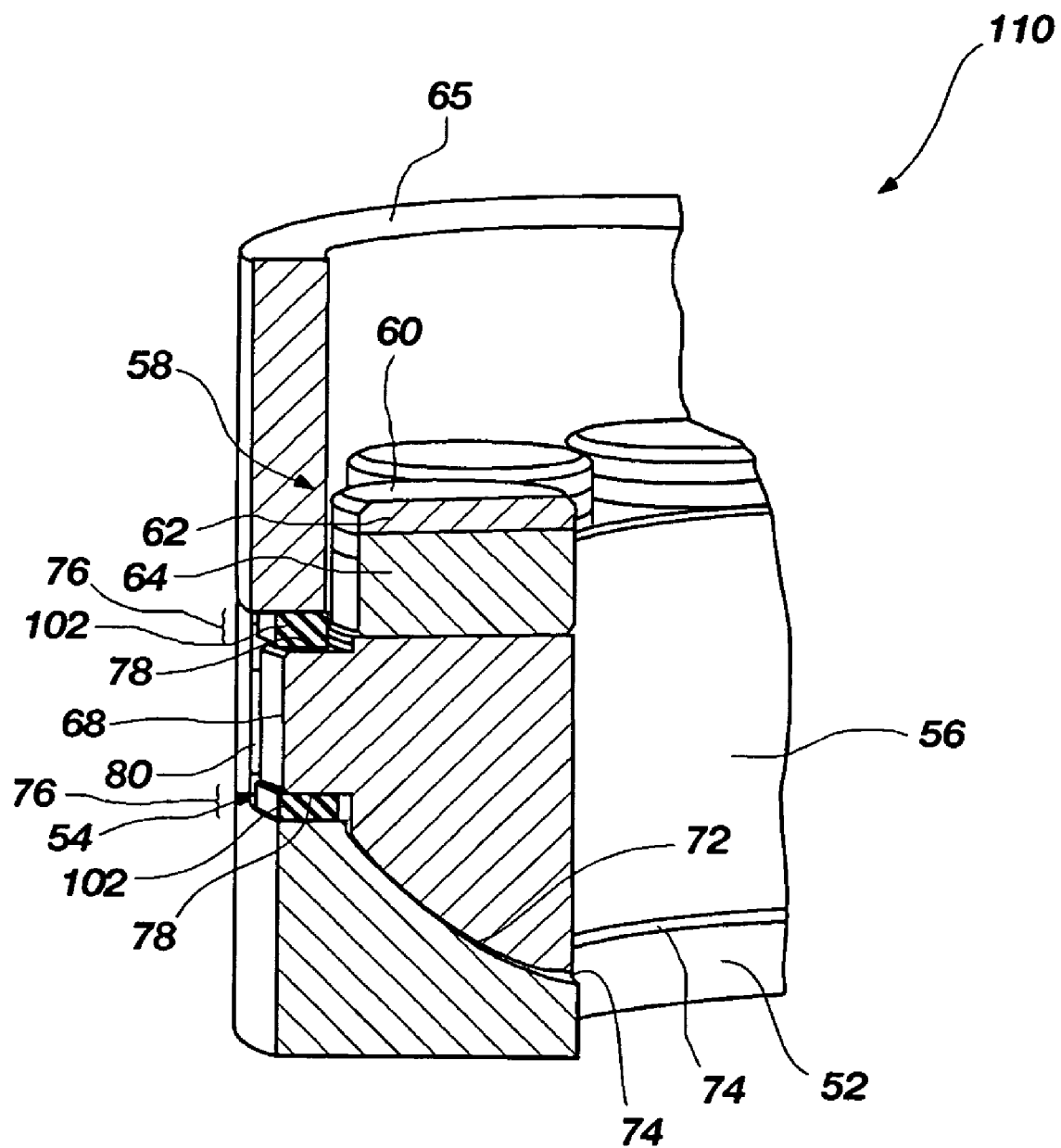
FIG. 12 is an isometric cut-away view of the thrust-bearing assembly including spacer elements positioned between each of the biasing elements and the projections, and each of the projections and the seat in accordance with yet another embodiment of the present invention.

FIG. 12 shows a thrust-bearing assembly 110 in accordance with yet another embodiment of the present invention for providing a selected rotational stiffness or resistance against rotation of the bearing support 56 within the seat 52. The thrust-bearing assembly 110 includes spacer elements 102 that may be positioned within the standoffs 76 between the retaining ring 65 and the projections 68 and/or the seat 52 and the projections 68. The spacer elements 102 may be formed from a compressible and/or resilient material (e.g., a polymeric material) selected to impart a desired stiffness or resistance against rotation of the bearing support 56 within the seat 52 (e.g., about an axis generally perpendicular to the thrust axis $T_A$). For example, the spacer element 102 may be configured as a sleeve or tubular structure that at least partially encloses the peripheral sides 78 of the projection 68. If desired, the thrust-bearing assembly 110 may also employ the biasing elements 82 shown and described with respect to the embodiment of FIG. 11.

Figure 13:
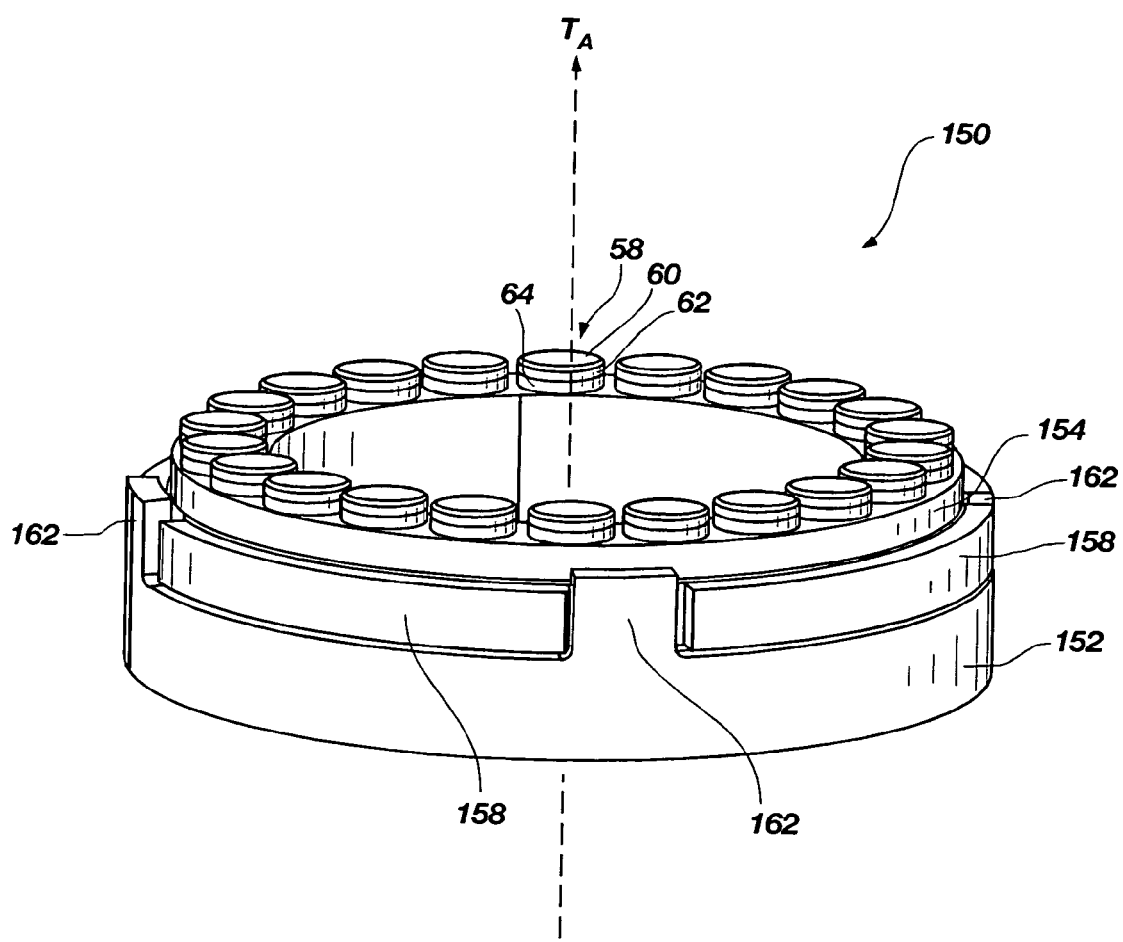
FIG. 13 is an isometric view of a thrust-bearing assembly including a plurality of circumferentially-elongated-projections extending from the bearing support in accordance with another embodiment of the present invention.
Figure 14:
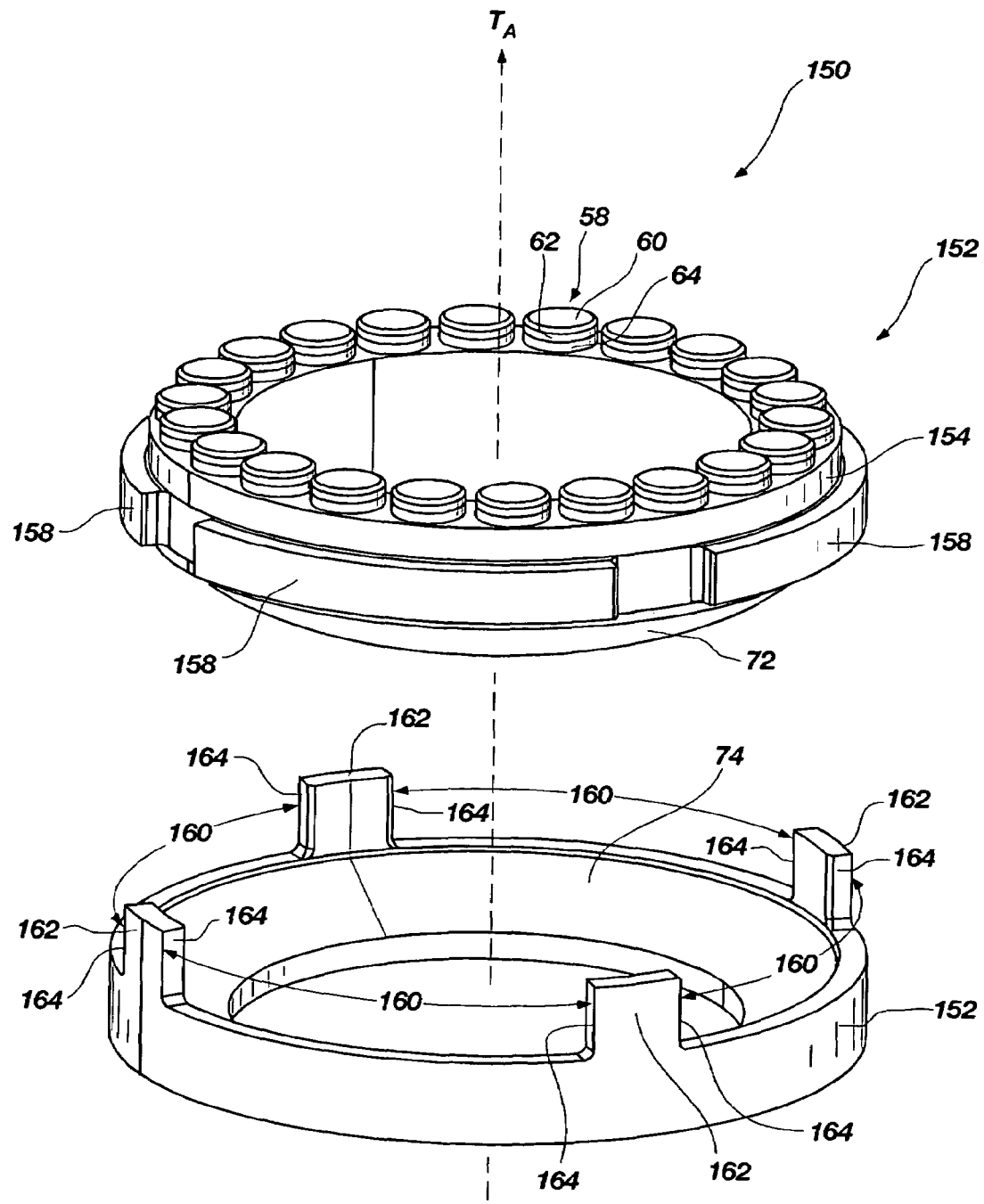
FIG. 14 is an exploded isometric view of the thrust-bearing assembly shown in FIG. 13.

The motion-limiting structure, such as the projections 68 shown in FIGS. 2 and 5, may have a variety of different configurations. For example, FIGS. 13 and 14 show a thrust-bearing assembly 150 in accordance with another embodiment of the present invention. The thrust-bearing assembly 150 is similar in construction to the thrust-bearing assembly 50 shown in FIG. 2. Therefore, in the interest of brevity, only some of the differences between the thrust-bearing assemblies 50 and 150 will be discussed. The retaining ring 65 is not illustrated in FIGS. 13 and 14 for the sake of clarity.

Figure 15:
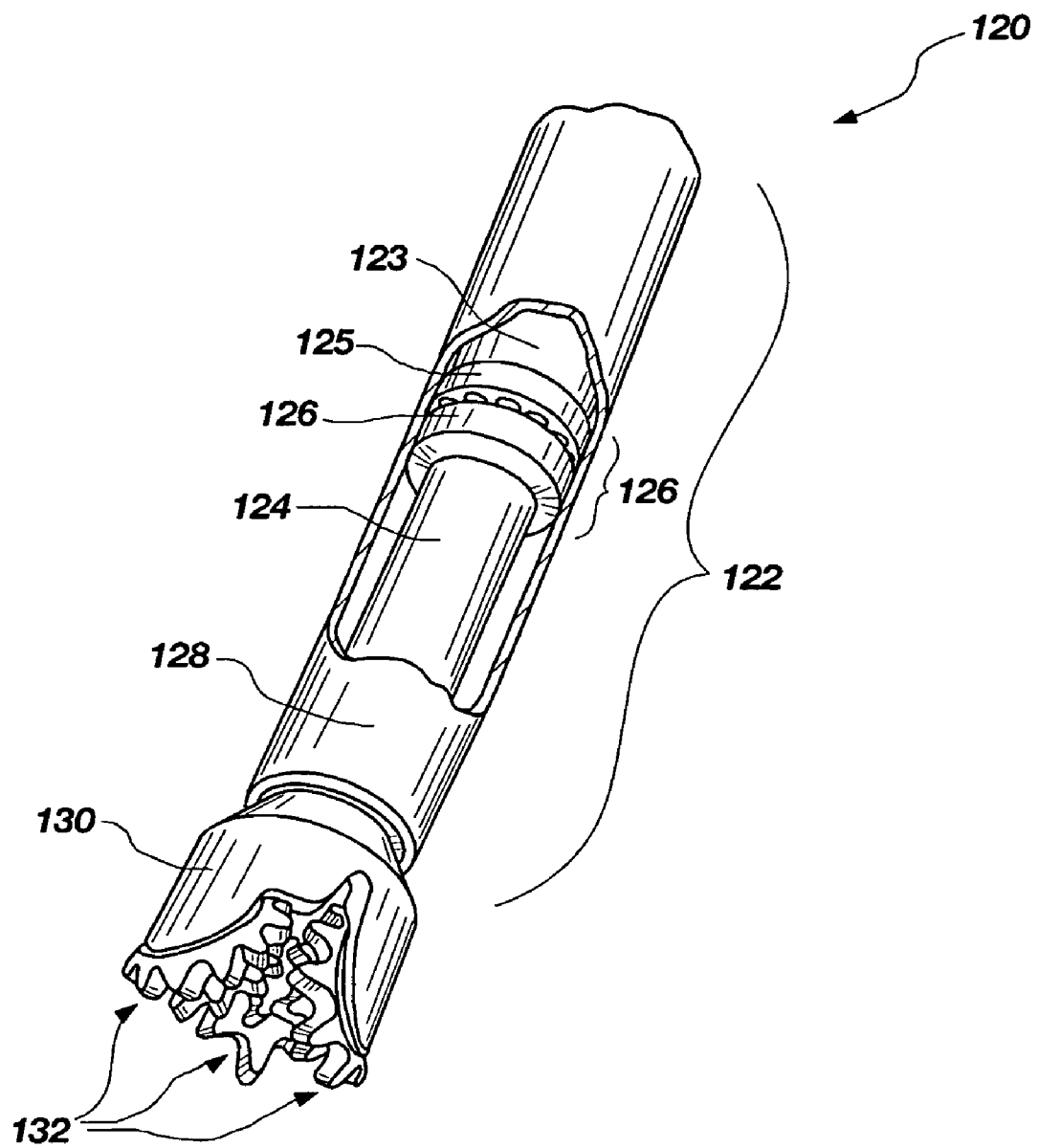
FIG. 15 is an isometric, partial, cut-away view of a subterranean drilling system including a thrust-bearing apparatus incorporating the thrust-bearing assemblies in accordance with various embodiments of the present invention.

The thrust-bearing assembly 150 includes a bearing support 152 with the circumferentially-spaced-apart bearing elements 58 mounted to the bearing support 152. The bearing support 152 comprises a body 154 including a plurality of projections 158 (i.e., a motion-limiting structure) extending radially from the body 154. Each of the projections 158 are elongated in a circumferential direction about the body 154. A seat 152 includes a plurality of slots 160 formed in peripherally extending wall 162. Each of the projections 158 is received in one of the slots 160 when the bearing support 158 and the seat 152 are assembled as shown in FIG. 13. The projections 158 and sidewalls 164 of the slots 160 cooperate to limit or restrict rotation of the bearing support 152 about the thrust axis $T_A$. As with the thrust-bearing assembly 50 shown in FIG. 2, other embodiments of the present invention may include only one or at least one projection as the motion-limiting structure that may be elongated in the circumferential direction. Furthermore, as with the thrust-bearing assembly 50, the bearing support 152 may also rotate about a plurality of axes generally perpendicular to the thrust axis $T_A$ to accommodate non-uniform loading and angular misalignment with an adjacent thrust-bearing assembly FIG. 15 shows an isometric view of a subterranean drilling system 120 incorporating any of the above-described thrust-bearing assemblies and apparatuses in accordance with various embodiments of the present invention. The subterranean drilling system 120 includes a motor assembly 122. The motor assembly 122 includes a housing 128 enclosing a downhole drilling motor 123 that is operably connected to an output shaft 124 and a thrust-bearing apparatus 126 assembled to the downhole drilling motor 123. The thrust-bearing apparatus 126 may include one of the previously described thrust-bearing assemblies or thrust-bearing apparatuses shown in FIGS. 2 through 14. A rotary drill bit 130 configured to engage a subterranean formation for drilling a borehole is connected to the output shaft 124. The rotary drill bit 130 is shown as a "roller cone" type bit including a plurality of roller cones 132. However, some embodiments may use other types of rotary drill bits, such as a fixed cutter drill bit (e.g., a drill bit including polycrystalline diamond cutting elements or compacts) or any other rotary drill bit or drilling tool (e.g., a reamer, reamer wing, impregnated diamond drill bit, core bit, etc.), without limitation. As the borehole is drilled, pipe sections may be connected to the downhole drilling motor 123 to form a drill string to enable progressively drilling the borehole to a greater depth within the earth.

The thrust-bearing apparatus 126 includes a stator 125 that does not rotate and a rotor 126 that is attached to the output shaft 124 and rotates therewith. The stator 125, rotor 126, or both may be configured as any of the above-described thrust-bearing assemblies shown in FIGS. 2 through 14. As known in the art, drilling fluid may be circulated through the downhole drilling motor 123 to generate torque and effect rotation of the output shaft 124 and the rotary drill bit 130 attached thereto so that a borehole may be drilled.

Although the thrust-bearing assemblies and apparatuses described above have been discussed in the context of subterranean drilling systems and applications, it should be understood that such thrust-bearing assemblies and apparatuses are not limited to such use and could be used within a bearing assembly or apparatus for varied applications, if desired, without limitation. Thus, such thrust-bearing assemblies and apparatuses are not limited for use with subterranean drilling systems and may be used with various other mechanical systems, without limitation.

The foregoing description, for purposes of explanation, used specific nomenclature to provide a thorough understanding of the present invention. However, it will be apparent to one skilled in the art that the specific details are not required in order to practice the present invention. The foregoing descriptions of specific embodiments of the present invention are presented for purpose of illustration and description. They are not intended to be exhaustive or to limit the invention to the precise forms disclosed. One ordinary skill in the art will recognize that many modifications and variations are possible in view of the above teachings. The embodiments are shown and described in order to best explain the principles of the present invention and its practical applications, to thereby enable others skilled in the art to best utilize the invention and various embodiments with various modifications as are suited to the particular use contemplated. It is intended that the scope of the present invention be defined by the following claims and their equivalents. The words "including" and "having," as used herein, including the claims, shall have the same meaning as the word "comprising."

The invention claimed is:

1. A thrust-bearing assembly, comprising:
   a seat including a generally spherical surface at least partially defining a recess;
   a bearing support positioned within the recess, the bearing support including a generally spherical surface configured so that the bearing support is capable of movement within the recess;
   at least one bearing element mounted to the bearing support;
   a motion-limiting structure configured to limit relative movement between the bearing support and the seat; and
   wherein the motion-limiting structure does not extend between the generally spherical surface of the seat and the generally spherical surface of the bearing support.

2. The thrust-bearing assembly of claim 1 wherein:
   the bearing support is rotatable about a plurality of axes generally perpendicular to a thrust axis; and
   the motion-limiting structure is configured to limit relative rotational movement between the bearing support and the seat about the thrust axis.

3. The thrust-bearing assembly of claim 1 wherein the motion-limiting structure comprises a plurality of projections extending from the bearing support.

4. The thrust-bearing assembly of claim 3 wherein each of the projections is integrally formed with the bearing support.

5. The thrust-bearing assembly of claim 3 wherein each of the projections is configured as a pin that is attached to the bearing support.

6. The thrust-bearing assembly of claim 3 wherein each of the projections extends radially outward from the bearing support.

7. The thrust-bearing assembly of claim 3 wherein each of the projections is elongated in a circumferential direction.

8. The thrust-bearing assembly of claim 1 wherein the motion-limiting structure comprises at least one projection that extends radially from the bearing support.

9. The thrust-bearing assembly of claim 3 wherein:
   the seat comprises a plurality of spaced apart openings; and
   each of the projections of the bearing support is received by one of the openings of the seat.

10. The thrust-bearing assembly of claim 1 wherein:
    the generally spherical surface of the seat comprises a concave-generally-spherical surface; and
    the generally spherical surface of the bearing support comprises a convex-generally-spherical surface mating with the concave-generally-spherical surface of the seat, the convex-generally-spherical surface having a center of curvature located at approximately the same location as a center of curvature of the concave-generally-spherical surface of the seat when the seat and the bearing are assembled together.

11. The thrust-bearing assembly of claim 10 wherein:
    the motion-limiting structure comprises a plurality of projections extending laterally from the bearing support;
    the seat comprises a plurality of spaced apart openings, each of the projections of the bearing support is received by one of the openings of the seat; and
    each of the projections comprises peripheral surfaces that can be positioned a standoff from sidewalls of a corresponding one of the openings.

12. The thrust-bearing assembly of claim 1:
    wherein the motion-limiting structure comprises a plurality of projections extending laterally from the bearing support;
    wherein each of the projections of the bearing support comprises a generally spherical surface having a center of curvature located at approximately the same location as a center of curvature of the generally spherical surface of the seat when the seat and the bearing support are assembled together; and
    further comprising a retaining member positioned adjacent to the bearing support to restrict displacement thereof in a direction along a thrust axis, the retaining member including a plurality of engagement members each of which includes an engagement surface that engages the generally spherical surface of one of the projections.

13. The thrust-bearing assembly of claim 3, further comprising a retaining member positioned adjacent to each of the projections to restrict displacement of the bearing support in a direction along a thrust axis.

14. The thrust-bearing assembly of claim 13 wherein the retaining member comprises a plurality of biasing elements, and further wherein each of the plurality of biasing elements is positioned and configured to bias at least one of the projections.

15. The thrust-bearing assembly of claim 14 wherein each of the biasing elements comprises a compression spring.

16. The thrust-bearing assembly of claim 3, further comprising a plurality of spacer elements, each of the plurality of spacer elements at least partially enclosing one of the projections.

17. The thrust-bearing assembly of claim 16 wherein each of the spacer elements comprises a compressible, resilient material.

18. The thrust-bearing assembly of claim 1 wherein the at least one bearing element comprises a plurality of spaced apart superhard inserts.

19. A thrust-bearing apparatus, comprising:
    a rotor comprising at least one bearing element including a rotor bearing surface;
    a stator comprising at least one bearing element including a stator bearing surface, the stator positioned so that the stator bearing surface opposes the rotor bearing surface; and
    wherein at least one of the rotor or the stator comprises:
      a seat including a generally spherical surface at least partially defining a recess;
      a bearing support positioned within the recess, the bearing support including a generally spherical surface configured so that the bearing support is capable of movement within the recess;
      at least one bearing element mounted to the bearing support;

a motion-limiting structure configured to limit relative movement between the bearing support and the seat; and wherein the motion-limiting structure does not extend between the generally spherical surface of the seat and the generally spherical surface of the bearing support.

20. The thrust-bearing apparatus of claim 19 wherein the motion-limiting structure comprises a plurality of projections extending from the bearing support.

21. A motor assembly for use in drilling subterranean formations, comprising:

a motor operable to apply torque to a rotary drill bit, the motor operably coupled to a thrust-bearing apparatus, the thrust-bearing apparatus comprising:

a rotor comprising at least one bearing element including a rotor bearing surface;

a stator comprising at least one bearing element including a stator bearing surface, the stator positioned so that the stator bearing surface opposes the rotor bearing surface; and wherein at least one of the rotor or the stator comprises:

a seat including a generally spherical surface at least partially defining a recess;

a bearing support positioned within the recess, the bearing support including a generally spherical surface configured so that the bearing support is capable of movement within the recess;

at least one bearing element mounted to the bearing support;

a motion-limiting structure configured to limit relative movement between the bearing support and the seat; and wherein the motion-limiting structure does not extend between the generally spherical surface of the seat and the generally spherical surface of the bearing support.

* * * * *

UNITED STATES PATENT AND TRADEMARK OFFICE
CERTIFICATE OF CORRECTION

PATENT NO. : 7,552,782 B1
APPLICATION NO. : 11/592412
DATED : June 30, 2009
INVENTOR(S) : Sexton et al.

It is certified that error appears in the above-identified patent and that said Letters Patent is hereby corrected as shown below:

Column 5
Line 13, change "more a" to --a more--

Column 9
Line 7, change "one" to --one of--

Signed and Sealed this

Twenty-fourth Day of November, 2009

David J. Kappos
*Director of the United States Patent and Trademark Office*